J. W. BRUCE.
AGRICULTURAL IMPLEMENT.
APPLICATION FILED SEPT. 2, 1913.
1,106,541.
Patented Aug. 11, 1914.
2 SHEETS—SHEET 1.
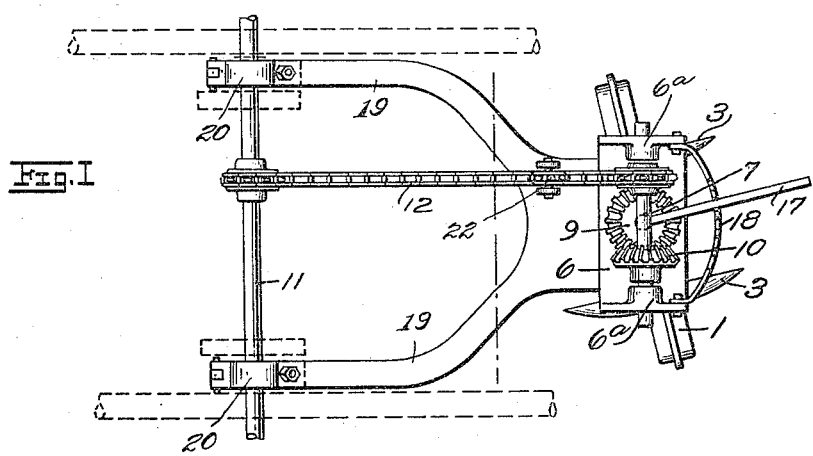
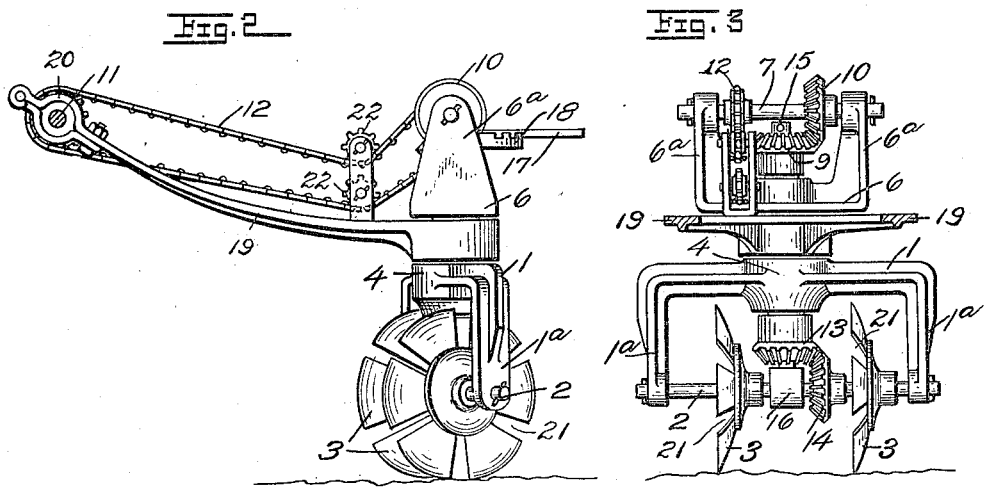
WITNESSES:
F. E. Arthur
L. S. Norris
INVENTOR—
J. W. Bruce
BY
N. E. Dunlap
ATTORNEY.
THE NORRIS PETERS CO., PHOTO-LITHO., WASHINGTON, D. C.

J. W. BRUCE.
AGRICULTURAL IMPLEMENT.
APPLICATION FILED SEPT. 2, 1913.

1,106,541.

Patented Aug. 11, 1914.
2 SHEETS—SHEET 2.

WITNESSES:
H. E. Arthur,
S. S. Morris.

INVENTOR
J. W. Bruce.
BY
H. E. Dunlap,
ATTORNEY.

THE NORRIS PETERS CO., PHOTO-LITHO., WASHINGTON, D. C.

UNITED STATES PATENT OFFICE.

JAMES WESLEY BRUCE, OF OZARK, OHIO.

AGRICULTURAL IMPLEMENT.

1,106,541.     Specification of Letters Patent.     Patented Aug. 11, 1914.

Application filed September 2, 1913. Serial No. 787,582.

*To all whom it may concern:*

Be it known that I, JAMES WESLEY BRUCE, a citizen of the United States of America, and a resident of Ozark, county of Monroe, and State of Ohio, have invented certain new and useful Improvements in Agricultural Implements, of which the following is a specification.

This invention relates broadly to improvements in agricultural implements, and specifically to a plow or like cultivating device.

The primary object of the invention is to provide a plow adapted for attachment to, and to be driven by, a traction, or self-propelled, vehicle.

A further object is to provide a device of the character mentioned adapted for turning a plurality of furrows at a time and in which the turning disks may be disposed at any suitable angle.

With these and other objects in view, the invention resides in the features of construction, arrangement of parts and combinations of elements which will hereinafter be exemplified, reference being had to the accompanying drawings, forming a part of this specification, in which—

Figure 4:
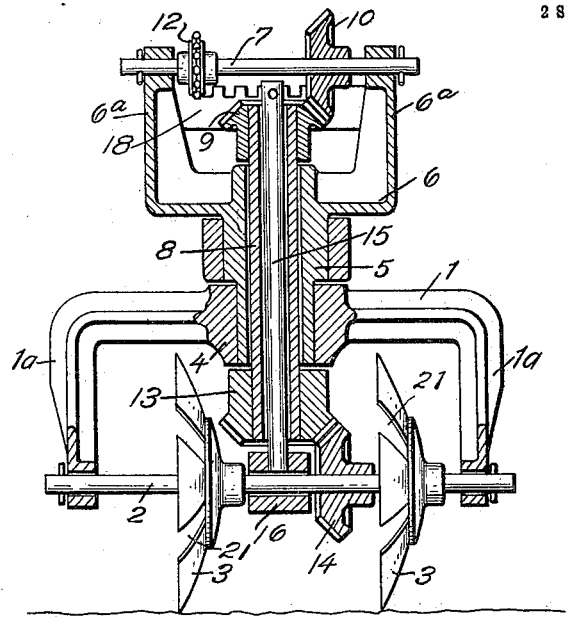
Figure 5:
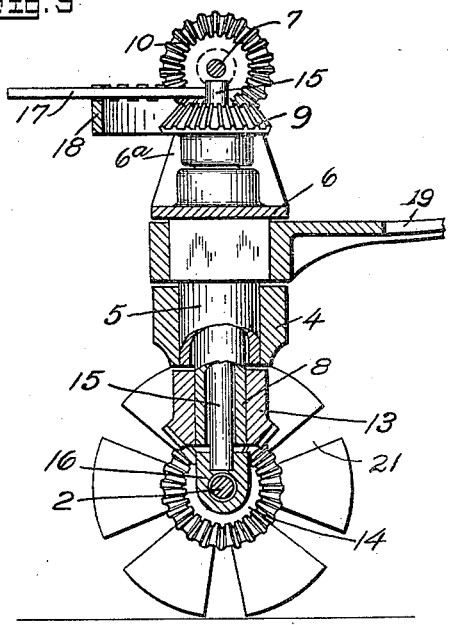

Figure 1 is a top plan view of the invention; Fig. 2 is a side elevation of the same; Fig. 3 is a front elevation of the same; Fig. 4 is an enlarged longitudinal section; and Fig. 5 is a transverse section.

Referring to said drawings, in which like designating characters distinguish like parts throughout the several views—1 indicates a yoke the parallel downwardly-directed arms 1ª of which have journaled in their lower ends a horizontal shaft 2 which has fixed thereon a plurality or gang of earth-working disks, or rotary plow elements 3, adapted for breaking the soil. Said yoke is provided with a centrally-located collar-portion or bearing 4 in which is received the reduced lower end of an upright tubular member 5 which carries on its upper end, or has formed integral therewith, as shown, a yoke 6 the parallel arms 6ª of which stand upright and have journaled in their upper ends a horizontal shaft 7. Rotatably mounted within said tubular member 5 and having its opposite ends protruding therefrom is a tubular shaft 8 which has fixed on its upper end a bevel gear 9 in mesh with a bevel gear 10 fixed on the shaft 7, the last-mentioned shaft being connected to and driven from a drive-shaft 11 of the self-propelled vehicle with which the device is associated, as by a sprocket chain 12. The lower end of said tubular shaft 8 has fixed thereon a bevel gear 13 in mesh with a bevel gear 14 carried by the shaft 2, whereby rotary motion communicated to said shaft 8 is in turn communicated to said shaft 2.

Extending vertically through the tubular shaft 8 is a standard 15 which is rigidly connected at its lower end to a sleeve or collar 16 which is loosely mounted on the shaft 2 and within which said shaft is rotatable. Rigidly connected to the upper end of said standard is a bar or lever 17 whereby the former may be turned, or partially rotated, for disposing the shaft 2 and its supporting yoke 1 at an angle to a transverse line through the device, as is clearly shown in Figs. 1 and 2, whereby the disks 3 are disposed at an angle to the line of drive. An arcuately curved notched bar 18 is so disposed with respect to the various positions which may be assumed by the lever 17 that the latter may be rigidly positioned for maintaining the standard 15, shaft 2 and disks 3 in adjusted position.

Mounted in fixed position upon the tubular member 5, as between the positions occupied by the yokes 1 and 6, is a horizontally disposed yoke, the arms 19 of which have their free ends suitably connected, as by clamps 20, to a fixed portion of the vehicle, whereby the parts constituting this invention are drawn by said vehicle.

The disks 3 are of the ordinary dished type and may be plain, but are preferably provided with radially directed slots, as shown at 21, whereby a plurality of fan-shaped vanes are formed, the last-mentioned type being better adapted for breaking and loosening the soil.

Adjustable idler sprocket wheels 22 are provided at suitable points, as shown in Fig. 2, whereby the tension of the driving sprocket chain 12 may be readily adjusted.

It will of course be obvious that various changes in the details of construction and in the arrangement of parts may be resorted to without departing from the general spirit or scope of the invention as defined in the appended claims. Hence I am not to be understood as limiting myself to the precise construction and arrangement of parts herein shown and described.

Having thus described my invention, what I claim as new, and desire to secure by Letters Patent, is—

1. An agricultural implement comprising, in combination with a vehicle carried power-shaft, an upright tubular member, a horizontally disposed yoke mounted on said member intermediate the ends thereof and having its arms attached to a fixed part of the vehicle, a yoke with downwardly directed arms mounted on the lower end of said member, a shaft journaled in said arms, a gang of earth-working disks on said shaft, a yoke with upright arms mounted on the upper end of said member, a shaft journaled in the last mentioned arms, means intermediate the last mentioned shaft and said power shaft whereby the former is driven, and means interposed between the shaft journaled in the upper yoke and that journaled in the lower yoke whereby motion imparted to the former is communicated to the latter.

2. An agricultural implement comprising, in combination with a vehicle carried power-shaft, an upright tubular member, a horizontally disposed yoke mounted on said member intermediate the ends thereof and having its arms attached to a fixed part of the vehicle, a yoke with downwardly directed arms mounted on the lower end of said member, a shaft journaled in said arms, a gang of earth-working disks on said shaft, a yoke with upright arms mounted on the upper end of said member, a shaft journaled in the last mentioned arms, means intermediate the last mentioned shaft and said power shaft whereby the former is driven, means interposed between the shaft journaled in the upper yoke and that journaled in the lower yoke whereby motion imparted to the former is communicated to the latter, and means whereby the lower yoke may be adjusted for varying the angle at which the earth-working disks operate with respect to the line of drive.

3. An agricultural implement comprising, in combination with a vehicle carried power-shaft, an upright tubular member, a horizontally disposed yoke mounted on said member intermediate the ends thereof and having its arms attached to a fixed part of the vehicle, a yoke with downwardly directed arms mounted on the lower end of said member, a shaft journaled in said arms, a gang of earth-working disks on said shaft, a yoke with upright arms mounted on the upper end of said member, a shaft journaled in the last mentioned arms, means intermediate the last mentioned shaft and said power shaft whereby the former is driven, a vertical shaft rotatably mounted within said member, gearing between the shaft of the uppermost yoke and said vertical shaft whereby the latter is driven, and gearing between said vertical shaft and the shaft of the lowermost yoke whereby motion imparted to the former is communicated to the latter.

4. An agricultural implement comprising, in combination with a self-propelled carried power-shaft, an upright tubular member, a horizontally disposed yoke mounted on said member intermediate the ends thereof and having its arms attached to a fixed part of the vehicle, a yoke with downwardly directed arms mounted on the lower end of said member, a shaft journaled in said arms, a gang of earth-working disks on said shaft, a yoke with upright arms mounted on the upper end of said member, a shaft journaled in the last mentioned arms, means intermediate the last mentioned shaft and said power shaft whereby the former is driven, a vertical shaft rotatably mounted within said member, gearing between the shaft of the uppermost yoke and said vertical shaft whereby the latter is driven, gearing between said vertical shaft and the shaft of the lowermost yoke whereby motion imparted to the former is communicated to the latter, and means whereby the position of the lowermost yoke on said member may be adjusted for varying the angle of the earth-working disks with respect to the line of drive.

5. An agricultural implement comprising, in combination with a vehicle carried power-shaft, an upright tubular member, a horizontally disposed yoke mounted on said member intermediate the ends thereof and having its arms attached to a fixed part of the vehicle, a yoke with downwardly directed arms mounted on the lower end of said member, a shaft journaled in said arms, a gang of earth-working disks on said shaft, a yoke with upright arms mounted on the upper end of said member, a shaft journaled in the last mentioned arms, means intermediate the last mentioned shaft and said power shaft whereby the former is driven, a vertical tubular shaft rotatably mounted within said member, gearing between the shaft of the uppermost yoke and said vertical shaft whereby the latter is driven, gearing between said vertical shaft and the shaft of the lowermost yoke whereby motion imparted to the former is communicated to the latter, a collar loosely mounted on the shaft of the lowermost yoke, a vertical standard fixed to said collar and extending upward through said tubular shaft, a lever whereby said standard may be partially rotated, and means whereby said lever is maintained in adjusted position.

In testimony whereof I affix my signature in the presence of two subscribing witnesses.

JAMES WESLEY BRUCE.

Witnesses:
S. J. BURKHARD,
EWART PUGH.

Copies of this patent may be obtained for five cents each, by addressing the "Commissioner of Patents, Washington, D. C."